United States Patent [19]
Das et al.

[11] Patent Number: 5,657,334
[45] Date of Patent: Aug. 12, 1997

[54] EXTERNAL HIGH VOLTAGE CONTROL FOR A LASER SYSTEM

[75] Inventors: Palash P. Das, Vista; Curtiss L. Mixon, Encinitas; Richard A. Eis; James D. Payne, both of San Diego, all of Calif.

[73] Assignee: Cymer, Inc., San Diego, Calif.

[21] Appl. No.: 601,907

[22] Filed: Feb. 15, 1996

[51] Int. Cl.⁶ .................................................. H01S 3/00
[52] U.S. Cl. .................................................. 372/33; 372/29
[58] Field of Search ............................ 372/33, 57, 55, 372/20, 69, 30

[56] References Cited

U.S. PATENT DOCUMENTS 5,463,650  10/1995  Ito et al. .................................... 372/57

*Primary Examiner*—Leon Scott, Jr.
*Attorney, Agent, or Firm*—David J. Power

[57] ABSTRACT

An external control system for a laser system, used as an illumination source for a stepper system, is provided. The external control allows for a measuring of the energy actually distributed to a wafer and a correction of the energy dose distribution based upon this measurement. In this way, a more precise energy dose control is achieved. The external control communicates with the laser's own internal control system to provide serial inputs which allow for corrections to be made to the High Voltage setting based upon the aforementioned measurements, and coordinates with the laser's internal control system to initiate laser operation at the required intervals.

5 Claims, 7 Drawing Sheets

EXTERNAL HIGH VOLTAGE CONTROL FOR A LASER SYSTEM

FIELD OF THE INVENTION

The present invention relates to an apparatus for controlling the amount of energy used excite laser gases by a pulse discharge, and particularly to an apparatus which allows external control of the output energy of a gas discharge laser used as an illumination source in a reduction projection alignment or "stepper" system.

BACKGROUND OF THE INVENTION

A stepper system, used in the manufacture of IC components, requires strict exposure control to secure high resolution in forming circuit patterns. Gas discharge lasers, such as excimer lasers, are now being used as the primary illumination source; replacing the i-line mercury lamps for advanced ULSI fabrication. In such industrial applications, it is extremely important to control the energy of the laser beam pulse in order to ensure consistent processing quality is maintained for each wafer. A control parameter of particular concern is the reduction in the variance of the pulse energy for each successive pulse, and the establishment of accurate dose control.

In a typical excimer laser system used as an illumination source for a stepper, as shown in FIG. 1, the excimer laser 1 outputs an excimer laser beam L which is used by stepper 9 to perform a reduction projection exposure. An oscillator 2 of laser device 1 comprises a chamber 15, an optical resonator, and other components known to those skilled in the art. The laser chamber 15 is filled with laser gasses which are typically Kr, $F_2$ or other known rare gas-halide combinations. Discharge voltage in the form of a pulse with a predetermined width and predetermined interval is applied across electrodes 12a and 12b to excite the gasses in the laser chamber 15 to oscillate the laser beam. The oscillated laser beam is input into the resonator and output as an effective oscillated laser beam L from a front mirror (not shown) of the resonator. Since the discharge voltage is applied as a pulse, the output laser beam L is likewise in the form of a pulse.

Part of the laser beam oscillated from oscillator 2 is sampled by a beam splitter 3 and input into an output monitor 5 through lens 4. The output monitor 5 detects the energy of laser beam L for each pulse. The pulse energy detected by output monitor 5 is supplied to the laser's output control unit 6, which generates voltage data on the basis of the pulse energy, and outputs the voltage data to a laser power source 8 so that laser power source 8 supplies the desired pulse energy to the stepper. The laser power source 8 supplies a voltage V across the electrodes in accordance with the supplied voltage data to thereby perform discharge. The voltage which causes discharge is temporarily charged to a storage unit, such as a capacitor 17, provided as part of the laser power source 8. The voltage stored in storage unit 17 is discharged by a switch such as a thyratron to initiate lasing of the gas mixture.

Output control unit 6 is connected through signal lines to a stepper control unit 6 in stepper 9 and receives a triggering signal Tr from stepper control unit 10 to cause the thyratron commute, thereby causing the laser to pulse discharge. The output control unit 6 has an internal timer which sequentially measures an interval of time between adjacent times when the output control unit 6 receives the signals Tr. A gas control unit 7 is also provided to replace part of the laser gasses consumed during laser operation to help ensure a constant laser output. Electrode temperature sensor 13 is disposed on a surface of an upper discharge electrode 12a (cathode) in laser chamber 15 to detect the surface temperature of the electrodes, and gas temperature sensor 14 is likewise disposed in chamber 15 to detect the temperature of the laser gases. Signals indicative of these respective temperatures is sent to control unit 6.

In the representative design of FIG. 1, the energy output of the laser is sampled by beam splitter 3, as previously described, and used as a basis for dose control by the laser's control unit. The energy levels measured directly from the laser via beam splitter 3 may differ from measured energy values actually received by the wafer as a result of degradation through the stepper's optics. This difference can have a significant impact, particularly as design rule features for ULSI devices reach the sub-0.4 μm levels.

SUMMARY OF THE INVENTION

It is an object of the present invention to provide a means for measuring an output energy from a laser on or near a wafer, and utilizing this measurement to make energy corrections via an external controller.

It is a further object of the present invention to allow more precise energy dose control to the wafer by means of externally monitoring and controlling the laser's energy output.

The aforementioned objects are accomplished by the external control system of the present invention. This external control operates in conjunction with the laser system's own internal control system; which in the preferred embodiment of the present invention is a control system utilizing multiple CPU's with shared memory on a common bus to provide high performance control. The external control communicates with the laser's internal system by use of a high speed interface, such as an RS485/427 port, coupled to an SBX PCB mounted on the laser's Trigger Control Board (TCB).

The external control provides High Voltage data inputs to adjust the charge on the main capacitor used to initiate the laser's discharge. The High Voltage inputs are controlled by a main control program which adjusts the High Voltage setting and communicates the modified settings to two interrupt programs. The interrupt programs initiate serial data entry to the laser's controller and monitor the Trigger control inputs from the stepper to initiate laser firing during Trigger Command periods.

DETAILED DESCRIPTION OF THE INVENTION

The present invention provides an apparatus and method for allowing external control of the supplied voltage used for creating a laser discharge. By utilizing sensors on or near the wafer itself, more accurate information regarding the laser output is obtained, which can be used by the external control to monitor and more precisely correct the energy output of the laser.

Figure 1:
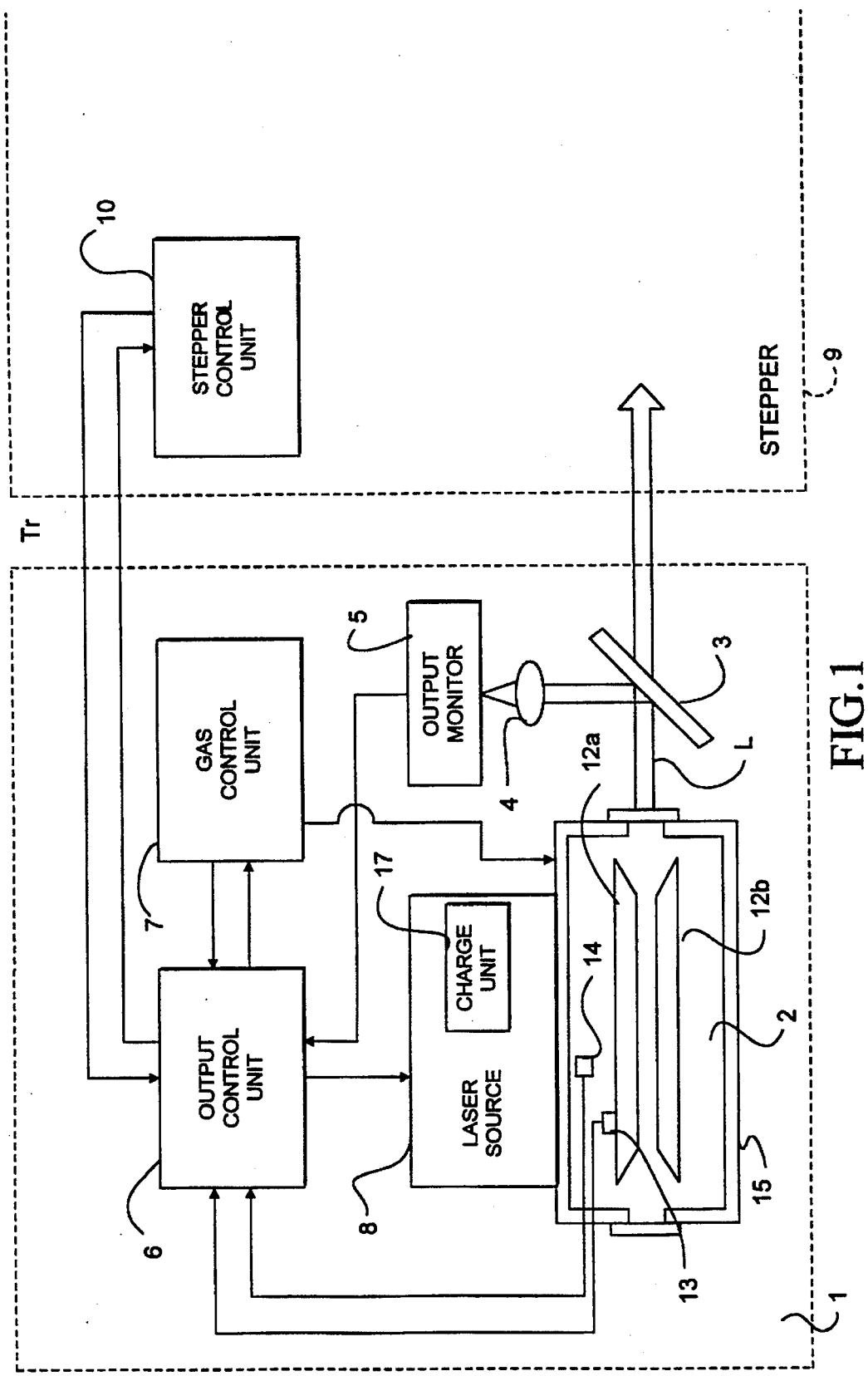
FIG. 1 depicts a prior art laser-stepper combination, wherein the laser has an internal energy control.
Figure 2:
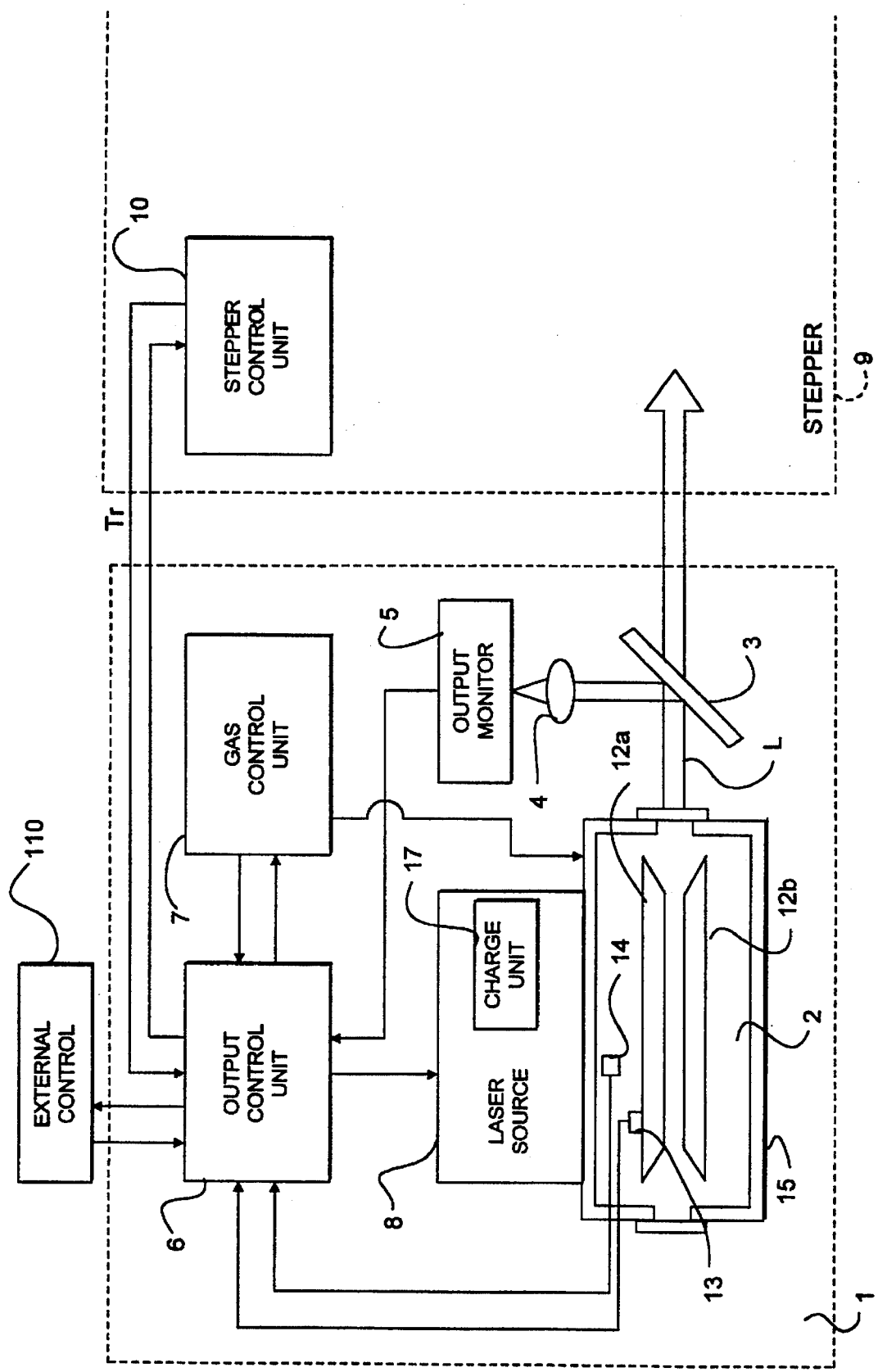
FIG. 2 depicts an external control for energy dose control for a laser-stepper combination in accordance with the present invention.
Figure 3:
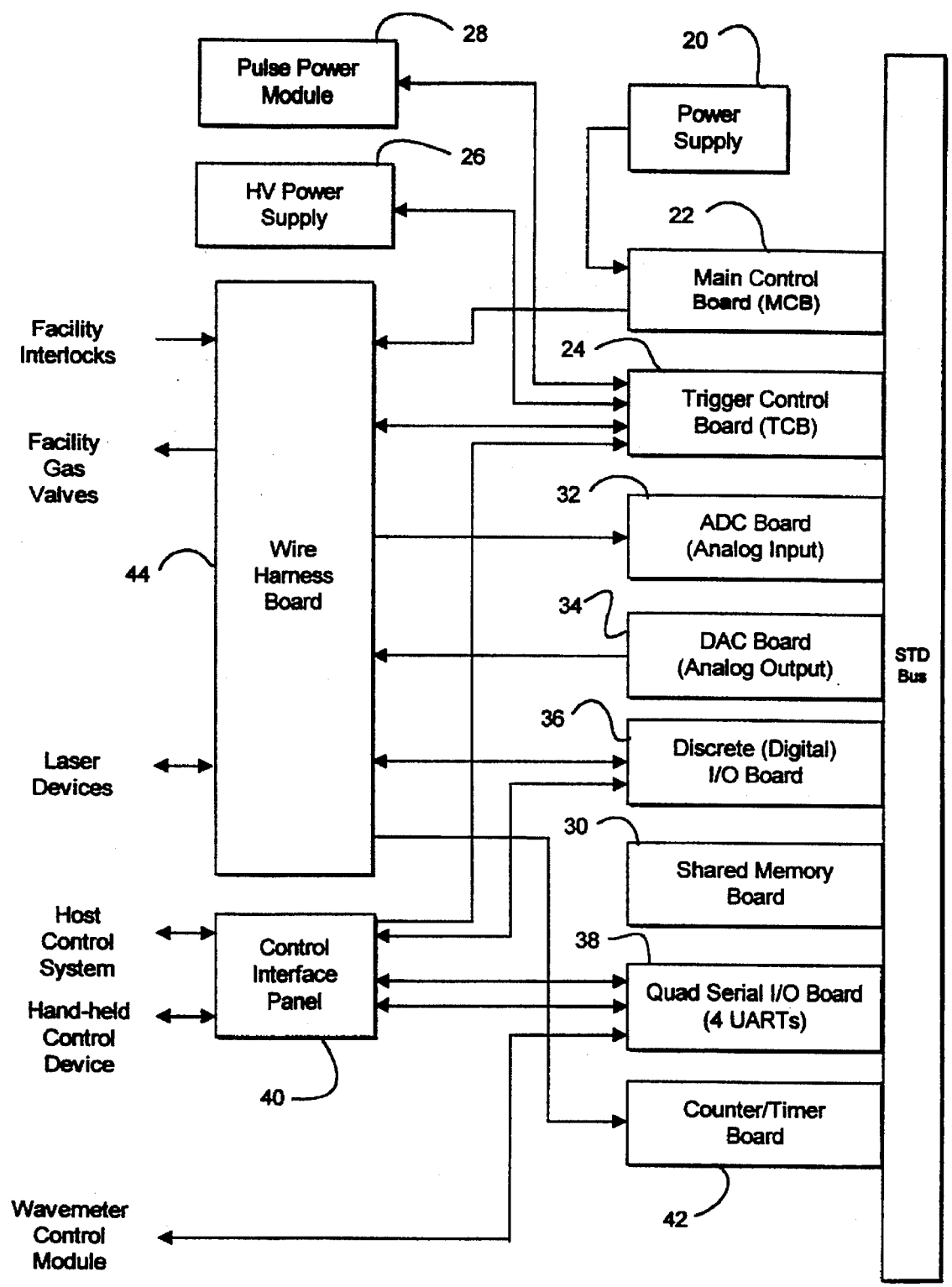
FIG. 3 is a schematic of the laser's internal control system for a preferred embodiment of the present invention.

Referring now to FIG. 2, the laser-stepper system previously described in FIG. 1 is shown having the additional external control 110 in accordance with the present invention, operably coupled to the output control unit 6. Referring now to FIG. 3, the gas discharge laser control system of the present invention is shown as being constructed around a popular bus structure; specifically in the preferred embodiment, the STD bus, in the form of a card cage accepting STD bus compatible commercially available card level components for the system. In that regard, power for the system is provided by power supply 20, which provides power to the power lines of the bus structure for powering the other boards in the system.

INTERNAL CONTROL SYSTEM OPERATION

A gas discharge laser control system utilized by the present invention will include a main control board 22, containing a processor and associated support circuitry, which will function as the master processor in the system. In the preferred embodiment, the main control board 22 is a single board computer having, at a minimum, an Intel type 486 processor with a minimum of 25 MHz clock speed, 128 Kbytes of battery backed-up RAM (random access memory), at least 512 Kbytes of flash memory and at least 512 Kbytes DRAM. This STD-80/MPX compatible processor board will have the capability of becoming a bus master in a multi-processor environment. Those skilled in the art will recognize that as operational demands increase for the laser control system, microprocessors which are faster and more powerful and with larger memories will be required in the configuration specified herein.

Also included in the gas discharge laser control system is a trigger control board 24, which operating on its own program, will control a separate high voltage power supply 26 and the pulse power module 28 to provide the pulse control and trigger for each pulse of the laser. In the preferred embodiment, the trigger control board (TCB) is also a single board computer having, at a minimum, an Intel type 486 processor with a minimum of 25 MHz clock speed, at least 128 Kbytes of battery-backed RAM, at least 512 Kbytes of flash memory and at least 512 Kbytes DRAM. This STD-80/MPX compatible processor board will also have the capability of becoming a bus master in a multi-processor environment. An SBX high speed serial/parallel I/O board is also provided as a daughter board which resides on the TCB for pulse-to-pulse interface capability.

The memory on the main control board 22 is dedicated for use by the processor on that board. As specified herein, the processor is at least a 486 processor. Similarly, the memory on the trigger control board 24 is dedicated for use by at least a 486 processor on that board. In addition, however, an additional memory board 30 is provided on the STD bus for shared use by the processors on the main control board 22 and the trigger control board 24. In that regard, the shared memory 30 in the preferred embodiment is a memory card containing at least 64 Kbytes of RAM in the STD bus card cage. It has an address space separate and apart from the address space of the memory on the main control board 22 and the memory on the trigger control board 24, but still within the total address space of the processors on these boards. In this way, data as well as programs may be exchanged between processors by a first processor, such as the processor on the main control board 22, writing such data into the shared memory 30 from which the same may be read by another processor, such as the processor on the trigger control board 24. Further details of this exchange and the activity on the STD bus in general will be subsequently described.

The laser control system used in the present invention also includes an analog-to-digital converter board 32 for receiving analog inputs, and a digital-to-analog converter board 34 for outputting analog signals. The analog input board 32 in the preferred embodiment contains thirty-two 12-bit analog input channels, multiplexed into a single 12-bit analog-to-digital (A/D) converter. Those skilled in the art will recognize that thirty-two channels was a design choice, and that the number of channels for a particular application may vary based upon operational requirements. The output of the analog-to-digital converter board 32 is accessible by the processors on the main control board 22 and the trigger control board 24 as an I/O mapped card. The digital-to-analog converter board 34 in the preferred embodiment contains eight separate 12-bit digital-to-analog output channels, it too being accessible by both processors as an I/O mapped card on the STD bus. As previously stated, eight channels was a design choice which those skilled in the art will recognize may vary depending upon operational requirements. There is also provided a second thirty-two channel A/D converter board, specifically dedicated to trigger control board 24.

Also included in the STD bus card cage is a discreet digital I/O board 36 and a quad serial I/O board 38. The discreet digital I/O board in the preferred embodiment provides a plurality of decoded (dedicated) I/O lines suitable for various functions. By way of specific example, in the preferred embodiment, the discreet digital I/O board 36 provides control of such things as the shutter, a dedicated line having only two states, open and closed.

A control interface panel 40 is provided for communicating with and receiving instructions from a host control system, or alternatively, receiving instructions from a hand-held control device. In general, the host control system and/or hand-held control device provides a customer-defined interface generally including certain dedicated or decoded lines for control signals such as a trigger signal when the same is provided externally to the laser control system of the present invention. Such signals, other than a trigger command itself, are provided to the discreet digital I/O board 36 through the control interface panel 40 as decoded digital signals. In that regard, in one mode of operation the trigger command may come from the host control system, or the hand-held control device, with the trigger command being provided through the control interface panel 40 to directly trigger the trigger control board 24 without intervention of the processor on the main control board 22 or use of the STD bus, all of course in accordance with software then operating in the trigger control board 24 in accordance with this mode.

The quad serial I/O board 38 in the preferred embodiment contains four UART's (universal asynchronous receiver/transmitters) to provide RS-232 communication capabilities to and from the laser control system in addition to the two RS-232 communication ports located on the processor. This type of communication with a system is useful not only for initialization purposes, but also for providing information to the host system regarding laser status and operation as the system is operating.

Finally, also located in the STD bus card cage is a programmable counter/timer board 42 providing programmable timers for the main control board 22 and the trigger control board 24, as well as counters to count events of other devices in the system such as the fan inside the chamber.

Most of the laser functions are monitored and/or controlled either directly from the main control board 22 or the trigger control board 24 through a wire harness board 44 coupled to the various monitoring and control devices, or by one of these boards through the STD bus and through the analog-to-digital converter board 32, the digital-to-analog converter board 34 counter and timer boards, and/or the discreet digital I/O board 36. In that regard, the analog-to-digital converter board provides the ability to interpret analog monitoring signals from the laser system, with the digital-to-analog converter board 34 providing the ability to output analog control signals for controlling analog proportional control devices in the laser system.

The reason each processor board includes its own dedicated I/O resources is to keep contention for the shared I/O resources on the STD bus to a minimum. In that regard, in the preferred embodiment of the present invention, the processors use a bus arbitration scheme as defined by the STD 80-MPX standard. At power-up, the highest priority processor, the master, gains control of the bus. Once the master finishes initialization, control is passed to the first slave processor. While the embodiment described herein only includes a single slave processor, this embodiment will accommodate up to seven processors. Accordingly, if more than one slave processor is used, the initialization process will continue until all slave processors have been initialized. When the last slave processor has been initialized, then the first slave processor establishes communications with the master and requests its program to be loaded. The master then transfers program data to a specific location in shared memory in discrete chunks, such as 2 Kbytes, signaling the slave that data is available upon completion of the transfer of each discrete chunk. The master then waits for the slave to load the program data and signal back for more. This process repeats until the entire program is loaded. The processors then begin operating independently, with each processor constantly checking shared memory for information from each other. Alternatively, an interrupt scheme, which will be described later, may be implemented for data passing between processors, providing a more efficient transfer mechanism and relieving the back plane of the STD card cage of a lot of otherwise unnecessary signal traffic.

The advantage realized is that the processors in the gas discharge laser control system are configured to serve distinct and different purposes. The master processor has a real-time operating system which, in one embodiment, has approximately 32 tasks under its control. These tasks are database managers, I/O monitoring routines, post-serial and parallel interface managers, user interface tasks, interprocessor data passing tasks, laser gas management and monitoring chamber temperature control, interlock monitoring and reporting, laser state managing, and others. These tasks are generally characterized as the slow, less time-critical tasks within the laser control system.

The trigger control processor, the only slave processor in the specific embodiment described, has the very time-critical tasks, such as the high voltage profiling, laser repetition rate, high speed user interface, and any laser pulse-to-laser pulse processing that needs to be done. As previously discussed, however, up to seven processors may be dedicated to the handling of very time-critical tasks. As a matter of comparison, in the embodiment described herein, the host processor operates on a 5 millisecond time base, with event timing accuracies of approximately ±10 milliseconds, whereas the slave processor operates on a 100 microsecond time base, with timing accuracies in the ±10 nanosecond range.

The processor on the trigger control board does not have a real-time operating system, but in a preferred embodiment has a program written in a high level programming language, such as C, and takes complete control of all onboard resources as needed. The master processor, on the other hand, uses its real-time operating system to manage system resources so that it can concentrate on handling the complex task of managing the laser system and coordinating the many tasks needed to do this successfully. Specific master tasks may include:

Receive key presses from the hand-held terminal (RS-232)
Display data on the hand-held terminal (RS-232)
Receive commands from the host system (RS-232)
Send replies to the host system (RS-232)
Receive commands from the host system (parallel lines)
Send status information to host system (parallel lines)
Monitor and control the shutter
Monitor and control gas system valves and vacuum pump to implement automated gas procedures
Monitor maintenance intervals and lifetimes of various laser hardware modules
Monitor safety interlock switches
Control safety lamps mounted on top of laser
Manage several data bases:
    Pulse-to-pulse data
    Configuration data
    Operating parameters
    I/O data (analog and pulse inputs)
    System errors
Monitor metal fluoride trap
Monitor and control chamber blower fan
Monitor and control chamber gas temperature
Monitor High Voltage pulse power supply
Monitor laser exhaust vent flow
Monitor nitrogen gas supply pressure
Monitor cooling water temperature
Monitor pulse-to-pulse log data for long term trend changes to determine effectiveness of chamber gas
Send commands to trigger (slave) processor
Receive data from trigger (slave) processor
Control laser states of readiness
Monitor and control line narrowing control subsystem

EXTERNAL HIGH VOLTAGE CONTROL

To provide a more precise energy dose control, sensors placed on or near the wafer provide measurement information regarding laser energy actually received by the wafer to the external control 110 of FIG. 2. Based upon this received measurement information, the external control will make any necessary corrections to the laser's energy output, pulse repetition or pulse duration, to ensure accurate energy dose control to the wafer.

Figure 4:
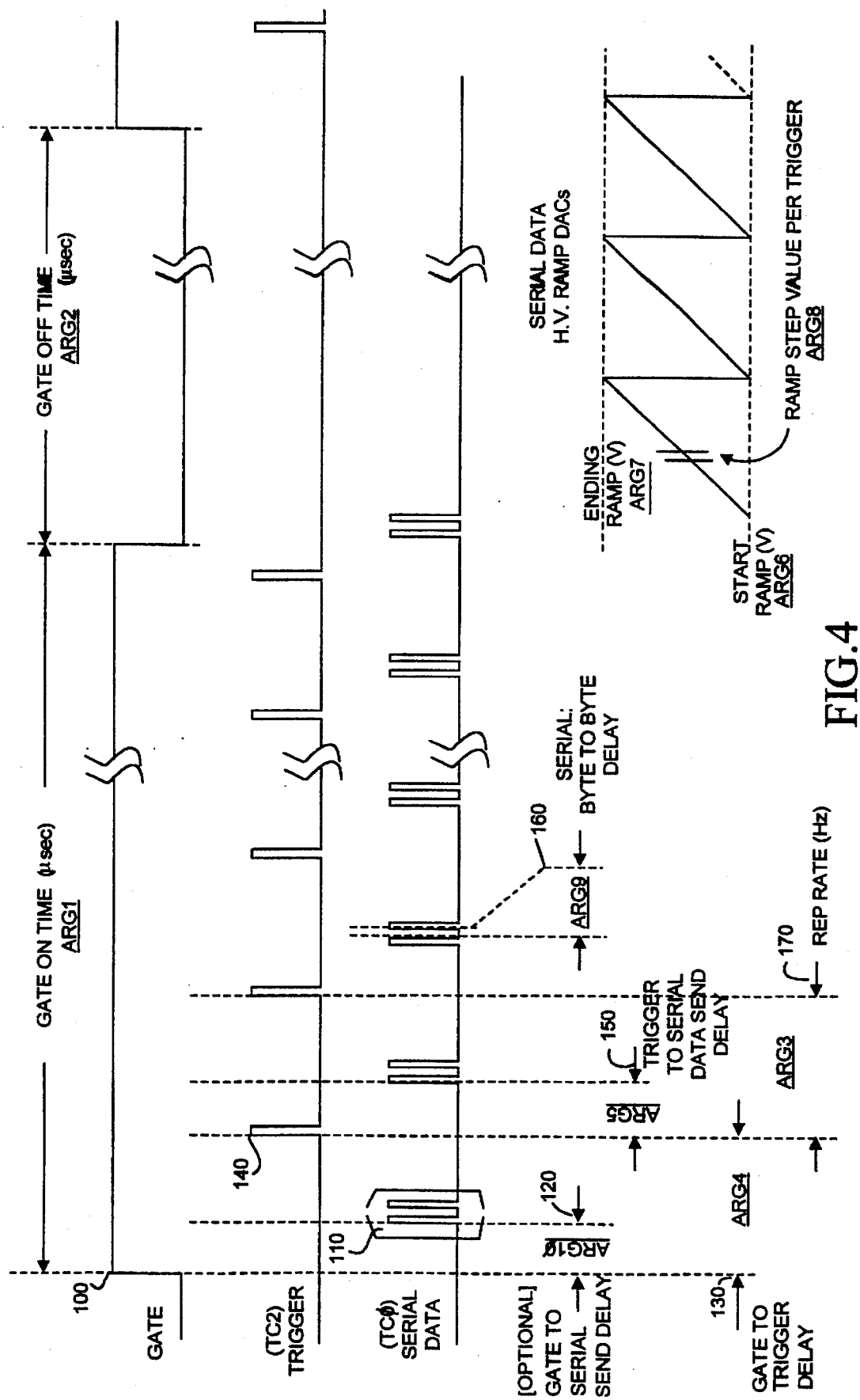
FIG. 4 is a timing schematic depicting the GATE, Serial Input and Trigger Timing sequences in accordance with the external control system of the present invention.

Control inputs from the external control are provided via a high speed communication interface, such as an RS 485/422, directly to the SBX high speed serial/parallel I/O board which resides on TCB 24 of FIG. 3. A brief overview of the external control function is provided to establish a framework for the external control's operation discussed infra. As shown in FIG. 4, the rising edge 100 of the GATE signal starts a charge cycle to initiate a pulse discharge by initializing the TCB to set the High Voltage Set Point (HV Set) to a minimum valve, HV min. This minimum is a Configurable in the laser's operating system, and represents a lower limit of a factory established High Voltage range. As the TCB is initialized, the external control is sending serial data 110, in a 2-byte or other sequence, to establish a Command HV Set point, HV Cmd, for charge unit 17 of FIG. 2. As shown in FIG. 4, a delay period 120, as per argument 10 (ARG 10) in Table 1, is established wherein if the serial data is not input within a predetermined period, such as 5 μs, the HV Cmd will be set to a default set point. There is also a byte-to-byte transmission delay 160 provided to allow for verification of all serial inputs by the system.

If the serial data is input prior to triggering the default, the inputs are likewise required to be received by the laser's output control unit within an established GATE to TRIGGER delay period 130, as per ARG 4, such as 300 μs, as shown in FIG. 4. The value input for HV Cmd is checked by the TCB to ensure it falls within limits set as a Configurable for laser operation. An example of the HV range is shown by the serial data HV ramp of FIG. 4., wherein stepped intervals for a start and end point is defined by ARG 6 to ARG 8 of Table 1. If the input for HV Cmd is not valid, a running average set point value is used, "HVavg." This value HVavg is initialized to an established first default set pont value, HVd, during the system control setup sequence. During operation, the HVavg value is calculated by averaging the last N number of HV Cmd values used to fire the laser. The number N is a Configurable set by the user and is based upon the operating parameters of the laser.

Once HV Cmd and HVavg are established, the TCB causes charge unit or capacitor 17, of FIG. 2, to charge to $V_{c/o}$ Stepper control unit 10 may then send a trigger pulse 140 after the appropriate delay time 130, as per ARG 4, shown in FIG. 4, to fire the laser. Firing of the laser will continue in accordance with the defined repetition rate 170 until the defined burst count expires or the GATE is dropped as per ARG 1. If the GATE drops during a burst, the remainder of the pulses in the burst count is terminated. After the first trigger signal (within the GATE pulse), the second HV setting, HV Cmd2, must finish its input prior to the expiration of the Trigger to Serial Data delay period 150, as per ARG 5, as shown in FIG. 4. These delay periods and input limitations will be driven by the particular hardware used. For example, with a system capable of running at 375 K baud, the transmit time for 2 bytes is 48 μs. As speeds for UART's increase, these time periods will decrease.

Figure 5:
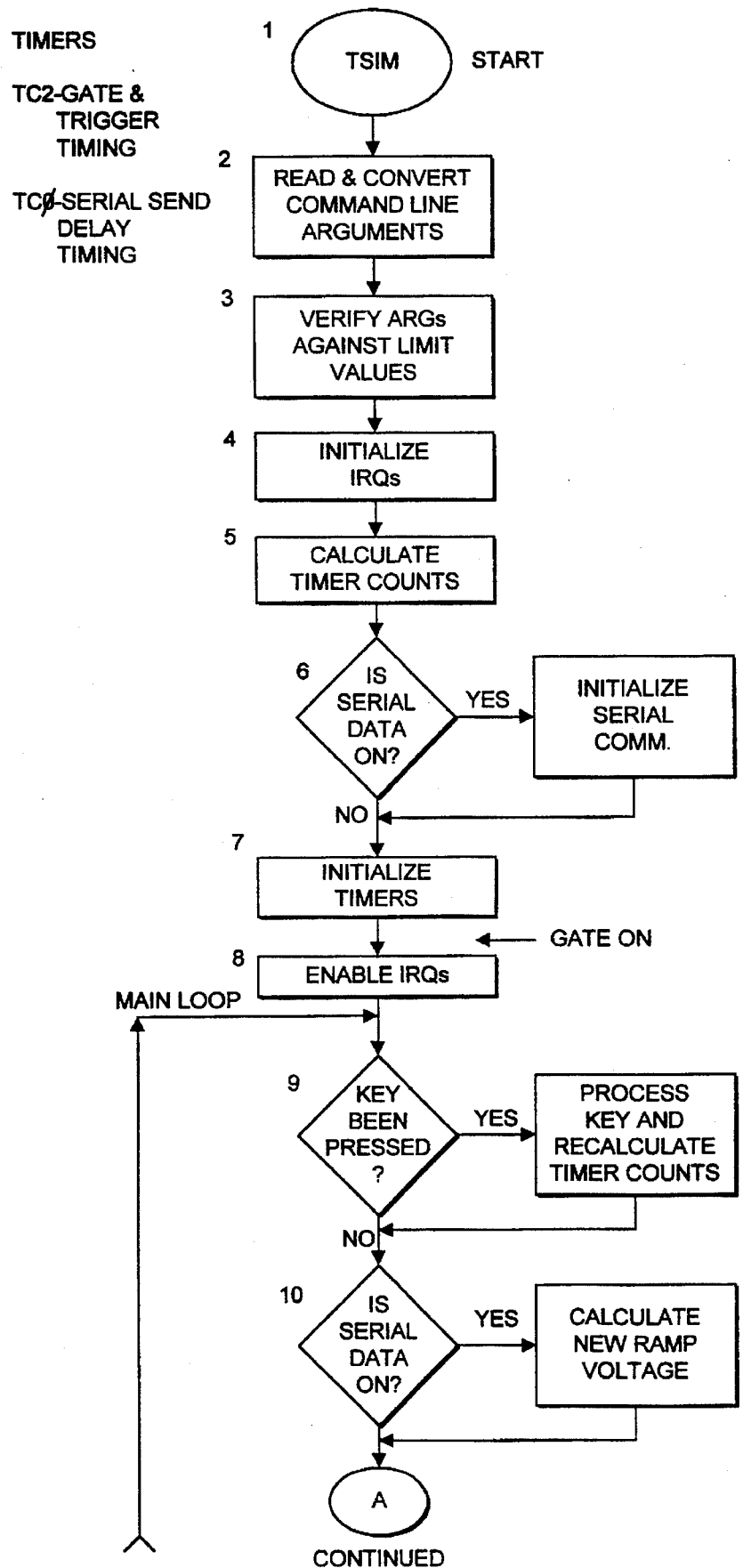
FIG. 5 is a schematic flowchart of the control process used by the present invention to provide external energy control.
Figure 6:
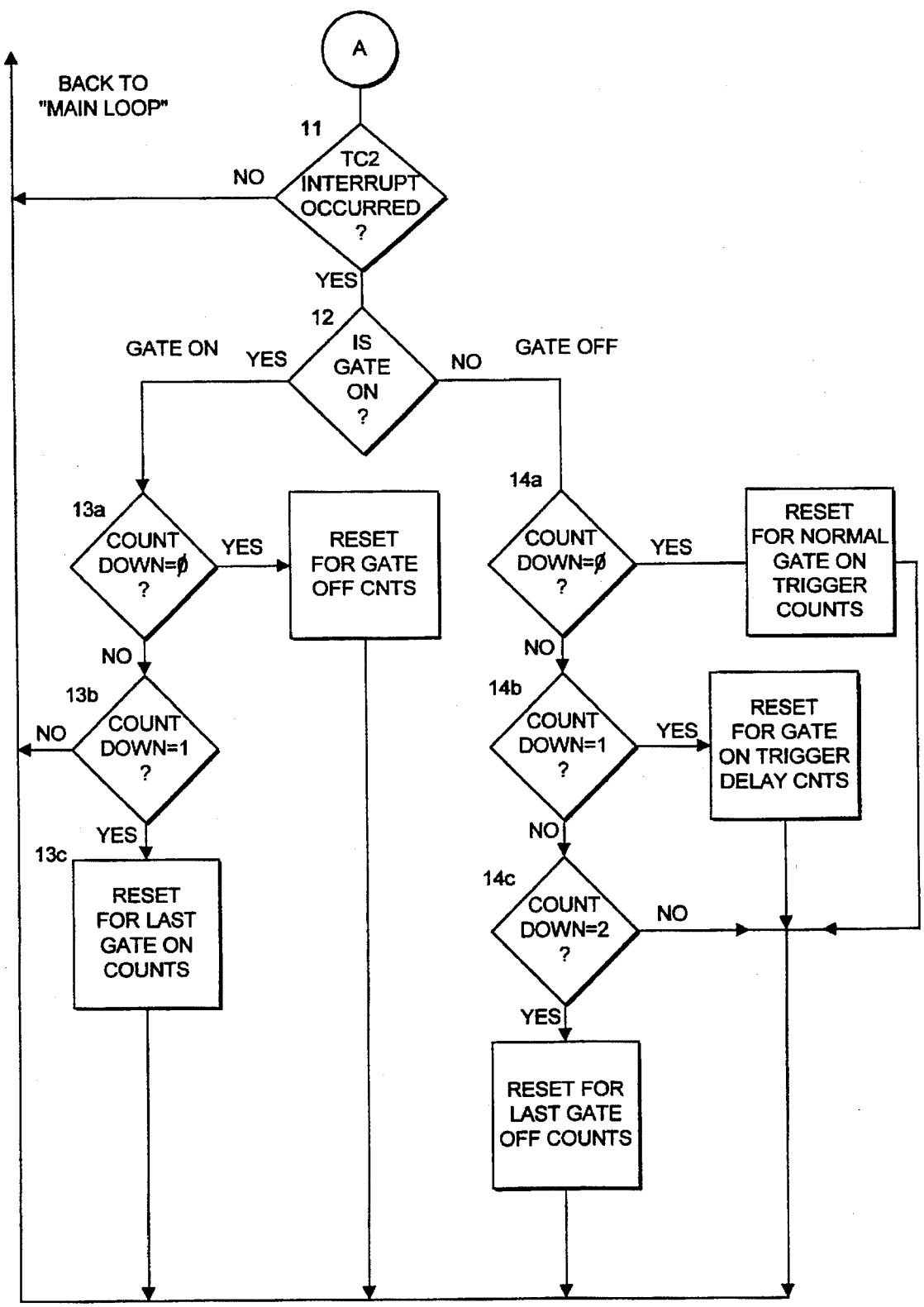
FIG. 6 is a continuation of the control schematic of FIG. 5.

An example of the signal inputs from the external control unit used to establish the HV set point of the laser is provided in FIG. 5 and FIG. 6. The following paragraphs are numbered to correspond to numbered steps in FIG. 5 and FIG. 6. For example, the paragraph numbered "3" below refers to the step numbered as "3" in the Figures. The numbers in the referenced Figures are to the left of the designated steps in the flowchart.

1. The external dose control for the laser is initiated, allowing the user to switch from adjusting energy output based on received inputs from a beam splitter at the laser's output, to a monitoring of actual energy received at or near the wafer and providing energy adjustments accordingly.
2. The external control reads and converts the common line arguments and shown in FIG. 4 specified in Table 1 (ARG) to initialize the external control system provided herein.
3. The range limit values, which are Configurables set for laser operation as previously described, are checked against those values set in the aforementioned arguments. Likewise delay times, default settings, pulse repetition rate, Trigger Timing and GATE limits are verified against operational limits.
4. The two interrupt control timers TC2 and TCØ are initialized to operate in the desired mode.
5. Input arguments are used to calculate TC2 and TCØ counter values and initialize the timers for the stepper, as well as the laser's internal control timer 42, shown in FIG. 3.
6. Verification of whether Trigger to Serial Data Send Delay is operational, as per ARG 5. If there is a delay, a "Yes" causes the SBX card to initialize its input parameters (i.e., baud rate, bits, etc.). If there is no delay, the program moves to Step 7.
7. The interrupt programs, TC2 and TCØ, identified in FIG. 7 and FIG. 8, for Gate and Trigger Timing, and Serial Send Delay timing, respectively, are initialized using calculations from Step 4. The initial GATE ON signal is activated to allow initial transmission of input serial data.

TABLE 1

MAIN - Command line arguments
Syntax TSIM arg1 arg2 arg3 arg4 arg5 ... arg9 arg10

Where:  arg1 = Gate ON time (in msec)
  (range: 5–32766 msec)
  arg2 = Gate OFF time (in msec)
  (range: 5–32766 (in msec)
  arg3: Trigger Rep Rate (in Hz)
  (range: 20–1000 Hz, or −1 = no triggers)
  arg4 = Gate to 1st Trigger delay (in usec)
  (range: 200–2000 usec)
  arg5 = HiSpeed Serial signal to send delay (usec)
  (range: 20–2000 usec, or −1 = no serial data)
  arg6 = HV Starting Ramp value (in volts)
  arg7 = HV Ending Ramp value (in volts)
  arg8 = Ramp step value (in DACs, 4 per volt)
  arg9 = HiSpeed Serial byte to byte delay (~usec)
  (range: 0–2000 usec, approx. time)
  arg10 = Initial Gate to Serial signal send delay (us)
  (range: must b 50 us less than arg4–arg7)

Run-time control commands:

F1 key = incr rep rate by 100
F2 key = decr rep rate by 100
F3 key = incr rep rate by 10
F4 key = decr rep rate by 10
F5 key = incr Gate ON time (msec) by 10
F6 key = decr Gate ON time (msec) by 10
F7 key = incr Gate OFF time (msec) by 10
F8 key = decr Gate OFF time (msec) by 10
"1" key = incr Gate ON time (msec) by 1
"2" key = decr Gate ON time (msec) by 1
"3" key = incr Gate OFF time (msec) by 1
"4" key = decr Gate OFF time (msec) by 1

8. Interrupt programs, TC2 and TCØ, are enabled to allow for trigger pulse input from the stepper and serial input from the external control.
9. Any new inputs are identified and verified as valid inputs, recognizable by the system, and within the required system parameters. Any valid inputs are then used to recalculate the timer counts of Step 7.

10. Re-verification of Step 6 as to whether serial input has been disabled or delayed. If the determination is that serial data inputs are being received, new HV Cmd is input as the modified High Voltage set point, as previously described.

11. A check is made to determine if TC2 interrupt has run. If the interrupt program has not been run, the system returns to Step 9. If flag indicating that TC2 has been run is read, the program moves to Step 12.

12. A check is made to determine if the GATE signal is still on, allowing the stepper control to initiate or continue laser firing. If the check confirms that GATE ON is true, the program moves to Step 13a.

13a. The number of trigger periods during the GATE ON period is verified. The trigger periods are computed as follows: Arg3=RepRate;

$$\frac{1}{Arg3} = \text{RepRateTime}$$

$$\text{Period} = \frac{\text{GATEONTime} - \text{InitialSerialDelay}}{\text{RepRatewTime}}$$

Using the pulse repetition rate, the total counts in a GATE period is computed to determine a maximum count number for each GATE. In this step, a check is made to determine if the full maximum count was reached. If the full maximum count was reached, the system resets for GATE OFF counts via TC2 and returns to Step 9. If the maximum count was not reached (Count Down ≠0) then the program moves to step 13b.

13b/c. The system verifies that a trigger period remains within the GATE ON period, determines the time in this shorter remaining period, and reloads the system as per Step 12, to account for this last shorter trigger period.

If in Step 12 it is determined that a GATE OFF condition exists the program moves from Step 12 to Step 14a.

14a. The same check for the number of trigger periods as provided in Step 13a is conducted. If the full maximum count is verified (CountDown=∅ is true), the program resets for GATE ON trigger counts via TC2 and returns to Step 9. If the full maximum count was not reached (CountDown=1), the program moves to Step 14b.

14b. Program verifies that a single trigger period remains, if the verification is true to program resets via TC2 to prepare for a new GATE ON period.

14c. If more than one trigger period remains, the program resets, as per Steps 13b/13c to account for the remaining periods and resets the counter via TC2 to complete the GATE OFF period. The program then returns to Step 9.

Figure 7:
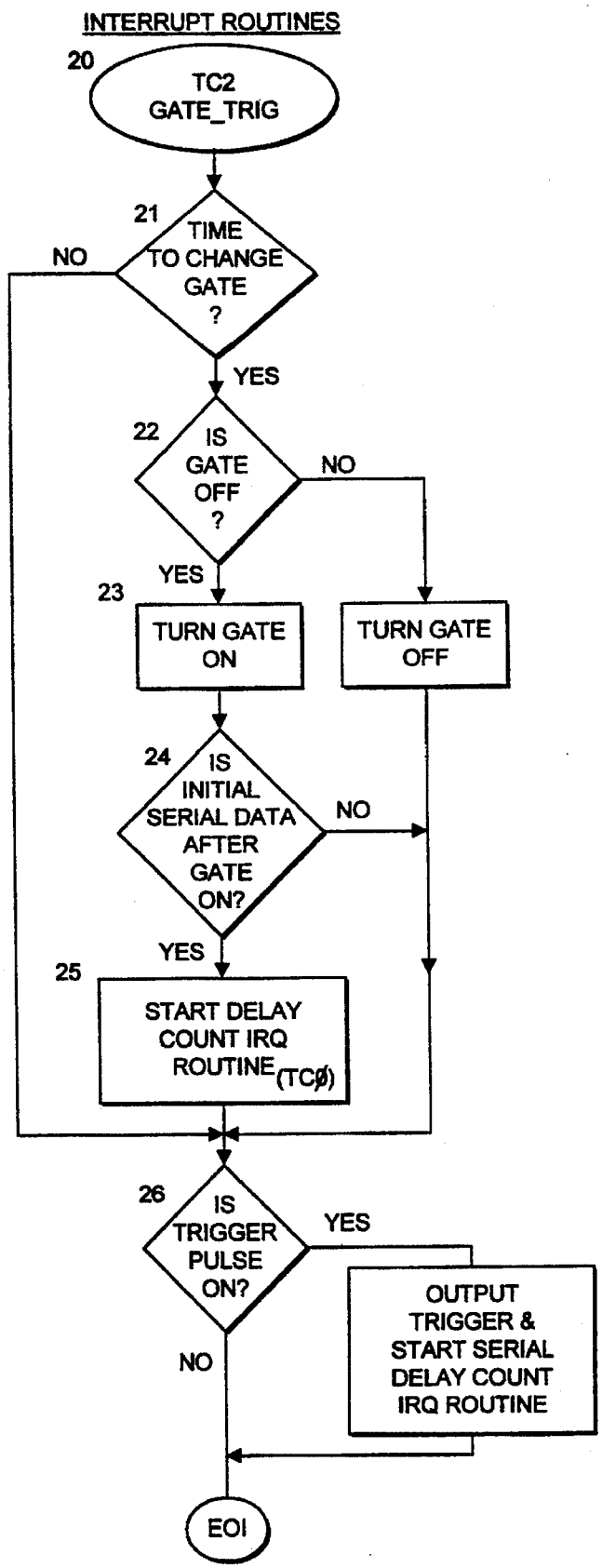
FIG. 7 is a schematic flowchart of the GATE and Trigger Timing interrupt program of the present invention.
Figure 8:
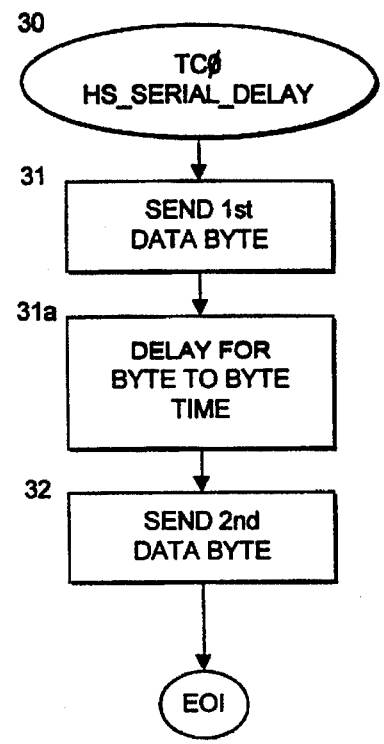
FIG. 8 is a schematic flowchart of the High Speed Serial Input and Delay interrupt program of the present invention.

An explanation of the interrupt sub-program TC2 and TC∅ will now be provided utilizing the same convention to identify numbered paragraphs to steps indicated in FIG. 7 and FIG. 8. It is to be noted that TC2 starts with the number "20," while TC∅ starts with the number "30."

TC2

20. The interrupt sub-routine, TC2, is accessed by the main program to reconfigure GATE and Trigger Timing for the system, as provided in Steps 12 to 14.

21. Check is made to determine if GATE status is to be changed (i.e., from GATE On to GATE OFF or GATE OFF to GATE ON status). If a GATE status is not to be changed, the interrupt program moves to Step 26. If a GATE status is to be changed, the program moves to Step 22.

22./23. Determination of present GATE status is made, and alternate status is prompted (i.e., current GATE ON to GATE OFF or GATE OFF switched to GATE ON).

24. Check is made to determine if a delay is required prior to allowing input of serial data form the external control.

25. If a delay is required (as an option set by the user), interrupt program TC∅, Step 30, is enabled and the countdown to its activation is started.

26. Check is made to determine if the stepper control has issued a trigger pulse command. If no command is given, the interrupt program ends, returning to the main program. If a trigger pulse signal has been sent the serial send/delay interrupt program TC∅, Step 30 is enabled and the countdown to its activation is started.

30. The high speed serial input and delay interrupt program has an optional, user-defined initial delay after the GATE ON signal before serial data is received by the output control.

31. After the specified delay, the first byte of serial data is input.

32. A delay for byte-to-byte transfer is initiated.

33. At the end of the delay, the second data byte is sent, and the program ends, returning to the main program.

In operation, Steps 1 to 8 of FIG. 5 are initially performed. Step 8 enables the interrupt programs TC∅ and TC2 of FIG. 7 and FIG. 8, respectively, and initially transmits a GATE ON signal 100 to the laser as shown in FIG. 4. The initial HVmin setting for the HV Cmd in Step 3 is checked in Steps 9 and 10 to determine if a new HV Cmd setting has been input.

As shown in FIG. 4, after the optional GATE to Serial Send delay (ARG10), TC∅ runs, sending the first and second data bytes 110. Step 11 checks to determine if a TC2 (Trigger/Gate) interrupt has occurred. TC2 will be governed by the external controller's counter/timer, which will determine the signaling for TC2 operation. Once TC2 is signaled, Step 21 verifies whether the GATE ON signal is close to terminating based on the time and the GATE signal duration. If time remains in the GATE period, Step 26 verifies that the stepper's trigger control is active and fires the laser upon receiving a trigger command from the stepper, as shown by element 140 of FIG. 4. Step 26 of TC2 triggers TC∅ to again wait the specified delay 150 and send serial inputs 110 of FIG. 4. Any changes to these HV Cmd inputs will be provided in Steps 9 and 10 as previously described. TC2 returns to the main loop and runs Steps 9 to 11 again. In Step 11, the previous firing of the laser will cause the main program to run Steps 12 to 14, wherein the time remaining for the GATE ON or GATE OFF period is checked and reset to allow for the required number of trigger pulses to be fired. External sensors monitor energy dose to the wafers and modify the HV Cmd setting as discussed to allow a more precise control of energy output.

While the present invention has been disclosed and described with respect to a certain preferred embodiment thereof, it will be understood by those skilled in the art that the present invention may be altered in various ways and realized in various embodiments without departing from the spirit and scope thereof.

What is claimed is:

1. A gas discharge control system for a laser comprising:

an internal laser control system, said control system having at least one high speed, switch-selectable, serial port card;

a high speed serial port operably coupled to said serial port card to allow energy control inputs from an external controller to the laser control system;

a high voltage power supply to charge a charge-unit to a command voltage set by said external inputs;

a laser trigger and timing means to cause said charge-unit to discharge across a pair of electrodes and initiate a laser pulse upon receipt of a trigger signal, said laser trigger and timing means operably coupled to said external controller to coordinate energy control inputs and laser trigger commands within a prescribed parameter.

2. The gas discharge control system of claim 1 wherein the high speed, switch-selectable, serial port card is an SBX PCB.

3. The gas discharge control system of claim 2 wherein the high speed serial port is an RS 485/422.

4. The gas discharge control system of claim 3 wherein the charge unit is a capacitor.

5. The gas discharge control system of claim 4 wherein the internal laser control system is a multiple CPU system on a common bus.

* * * * *